United States Patent
Huang et al.

(10) Patent No.: US 9,523,838 B2
(45) Date of Patent: Dec. 20, 2016

(54) WIDE-ANGLE LENS

(71) Applicant: Soartek Optoelectronics Technology Co., Ltd., Zhongli, Taoyuan County (TW)

(72) Inventors: Chun-Yang Huang, Taichung (TW); Fu-Ping Shih, Taichung (TW)

(73) Assignee: COXON PRECISE INDUSTRIAL CO., LTD., Taoyuan (TW)

( * ) Notice: Subject to any disclaimer, the term of this patent is extended or adjusted under 35 U.S.C. 154(b) by 0 days.

(21) Appl. No.: 14/641,648

(22) Filed: Mar. 9, 2015

(65) Prior Publication Data
US 2015/0253575 A1 Sep. 10, 2015

(30) Foreign Application Priority Data
Mar. 10, 2014 (TW) ................ 103108079 A (51) Int. Cl.
G02B 9/06 (2006.01)
G02B 27/01 (2006.01)
G02B 13/18 (2006.01)
G02B 13/00 (2006.01)

(52) U.S. Cl.
CPC ............ *G02B 9/06* (2013.01); *G02B 13/003* (2013.01); *G02B 13/18* (2013.01); *G02B 27/0172* (2013.01)

(58) Field of Classification Search
CPC ............ G02B 9/04; G02B 9/06; G02B 13/003
USPC .................... 359/646, 717, 794, 798
See application file for complete search history.

(56) References Cited

U.S. PATENT DOCUMENTS 6,885,508 B2 * 4/2005 Yamaguchi ............. G02B 9/06
348/E5.027

* cited by examiner

*Primary Examiner* — Darryl J Collins
(74) *Attorney, Agent, or Firm* — Amin, Turocy & Watson LLP; Gregory Turocy

(57) ABSTRACT

A wide-angle lens is applicable to a head-mounted display having a display screen. The wide-angle lens includes a first lens having a positive refractive power and a second lens having a positive refractive power. Light emitted by the display screen passes to a user through the second lens and the first lens sequentially. The wide-angle lens satisfies the following conditions:

$$-0.65 < \frac{f}{f_1} - \frac{f}{f_2} < 0.60 \text{ and } 0.2 < \frac{f_1}{f_2} < 3.8,$$

where $f_1$ and $f_2$ are the focal lengths of the first lens and the second lens, respectively, and f is the focal length of the wide-angle lens. The wide-angle lens has a greater view angle and achieves better parallax correction.

8 Claims, 9 Drawing Sheets

WIDE-ANGLE LENS

BACKGROUND OF THE INVENTION

1. Field of the Invention

The present invention relates to lenses of cameras, and, more particularly, to a wide-angle lens applicable to a head-mounted display.

2. Description of Related Art

At present, head-mounted displays (HMD), which are optical devices for stereoscopic displaying, are becoming more and more popular. HMDs dispose a small CRT or LCD monitor at the front of each eye. Using stereo effect of binocular parallax, the output image of the CRT or LCD monitor are projected to the pupil via optical components, and then the images are projected to the users' retinas. The images are reassembled by the user's brain via optic nerve conduction to generate flat or three-dimensional and large sizes of the images.

Although recent techniques of HMDs are gradually progressing, usually by processing images via software, processed images are unavoidably distorted. Furthermore, current HMDs are designed in larger volume in order to have wider perspective so that the weight of them can not be reduced.

Hence, it is a highly urgent technique issue in the industry to design a wide-angle lens with large perspective and providing good image quality.

SUMMARY OF THE INVENTION

The present invention provides a wide-angle lens applicable to a head-mounted display having a display screen. The wide-angle lens comprises: a first lens having a positive refractive power and disposed far from the display screen; and a second lens having a positive refractive power and disposed near the display screen. Light emitted by the display screen passes to a user through the second lens and the first lens sequentially. The wide-angle lens satisfies the following conditions:

$$-0.65 < \frac{f}{f_1} - \frac{f}{f_2} < 0.60 \text{ and } 0.2 < \frac{f_1}{f_2} < 3.8,$$

where $f_1$ and $f_2$ are the focal lengths of the first lens and the second lens, respectively, and f is the focal lengths of the wide-angle lens.

In an embodiment, the wide-angle lens further satisfies the following condition:

$$0.2 < \frac{f}{f_1} < 0.85.$$

In another embodiment, the wide-angle lens further satisfies the following condition:

$$0.15 < \frac{f}{f_2} < 0.95.$$

In yet another embodiment, the wide-angle lens further satisfies the following condition:

$$1 < \frac{f}{ImgH} < 1.7,$$

where ImgH represents the image height of an image corresponding to a maximum field of view (FOV).

In further another embodiment, the first lens satisfies the following condition: $N_1>1.52$, where $N_1$ is the refractive index of the first lens, and the second lens satisfies the following the condition: $N_2>1.49$, where $N_2$ is the refractive index of the second lens.

Compared with the prior art, the wide-angle lens according to the present invention has a greater view angle, and the first lens and the second lens have aspherical lens surfaces, so as to reach better aberration correction. Hence, the present invention is suitable for HMDs, game consoles and other electronic equipment.

DETAILED DESCRIPTION OF PREFERRED EMBODIMENTS

The following embodiments are provided to illustrate the disclosure of the present invention; those in the art can apparently understand these and other advantages and affects after reading the disclosure of this specification. The present invention can also be performed or applied by other different embodiments.

Figure 1:
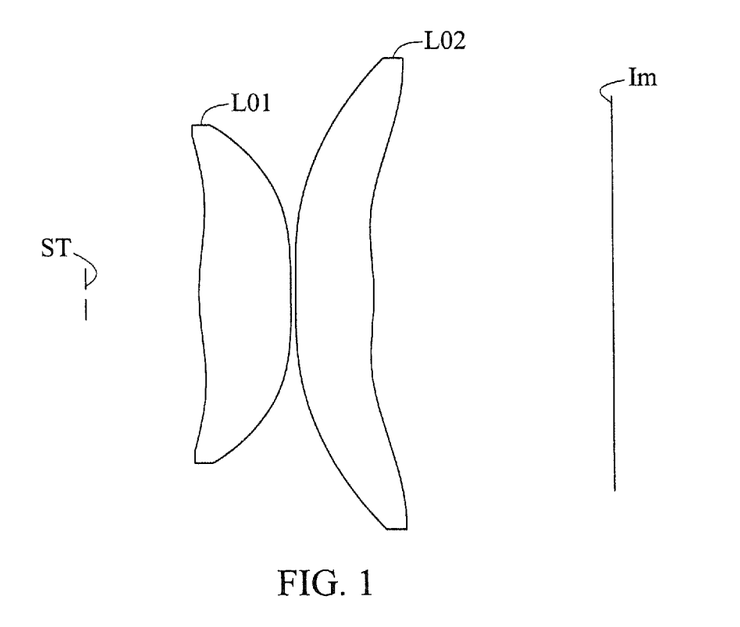
FIG. 1 is a diagram of lenses combination illustrating a wide-angle lens according to the present invention.

FIG. 1 is a diagram of lenses combination illustrating a wide-angle lens according to the present invention. The wide-angle lens is assembled in the HMD with a display screen Im. The wide-angle lens comprises a first lens L01 and a second lens L02 in order from the side of the diaphragm ST to the side of the display screen Im. It should be noted that the position of the diaphragm ST represents the position of pupils of human eyes and the display screen Im can display images for user to watch. Hence, light emitted from the display screen Im passes to the pupils of the user through the second lens L02 and the first lens L01 sequentially.

The first lens has a positive refractive power and disposed far from the display screen Im. The second lens has a positive refractive power and disposed near the display screen Im. The first lens L01 satisfies the condition $N_1>1.52$, where $N_1$ is the refractive index of the first lens L01. The second lens L02 satisfies the condition $N_2>1.49$, where $N_2$ is the refractive index of the first lens L02. The first lens L01 and the second lens L02 are plastic to reach weight reduction.

The first lens L01 and the second lens L02 satisfy the following conditions:

$$-0.65 < \frac{f}{f_1} - \frac{f}{f_2} < 0.60, \quad (1)$$

$$0.2 < \frac{f_1}{f_2} < 3.8, \quad (2)$$

$$0.2 < \frac{f}{f_1} < 0.85, \quad (3)$$

$$0.15 < \frac{f}{f_2} < 0.95 \text{ or} \quad (4)$$

$$1 < \frac{f}{ImgH} < 1.7, \quad (5)$$

where $f_1$ and $f_2$ are the focal lengths of the first lens L01 and the second lens L02 respectively, f is the focal length of the wide-angle lens, and ImgH represents the image height of an image corresponding to a maximum field of view (FOV).

When satisfying condition (1), the wide-angle lens achieves weight reduction and good aberration. When satisfying condition (2) or (5), the wide-angle lens has a view angle greater than 85°. When satisfying condition (3) or (4), the wide-angle lens achieves good aberration correction.

Moreover, the first lens L01 has at least one aspherical lens surface, and the second lens L02 also has at least one aspherical lens surface. The aspherical lens surfaces satisfy the aspherical condition:

$$Z = \frac{Cy^2}{1+\sqrt{1-(1+K)C^2y^2}} + (A)y^4 + (B)y^6 + (C)y^8 + (D)y^{10} + (E)y^{12},$$

$$C = 1/R,$$

where z is the displacement with respect to the surface apex on the optical axis, y is the height measured from the optical axis, R is the curvature radius of the apex, K is the conic constant, and A, B, C, D and E are the aspherical correction coefficients, thereby to achieve a good aberration correction.

It is clear from the above description that the wide-angle lens according to the present invention has excellent aberration correction, greater view angle, and good volume control.

The following description is about the specific embodiments of the wide-angle lens according to the present invention, wherein L11, L21, L31 and L41 represent the first lens, and L12, L22, L32 and L42 represent the second lens.

The First Embodiment

Figure 2A:
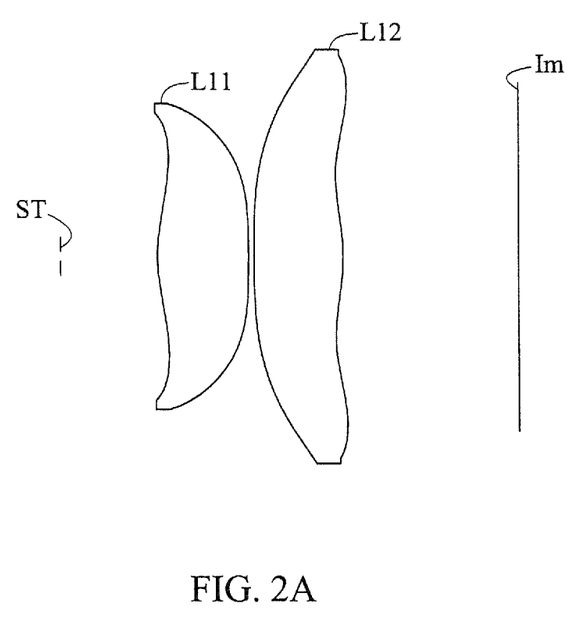
FIG. 2A is a diagram of lenses combination depicting a first embodiment illustrating a wide-angle lens according to the present invention.
Figure 2B:
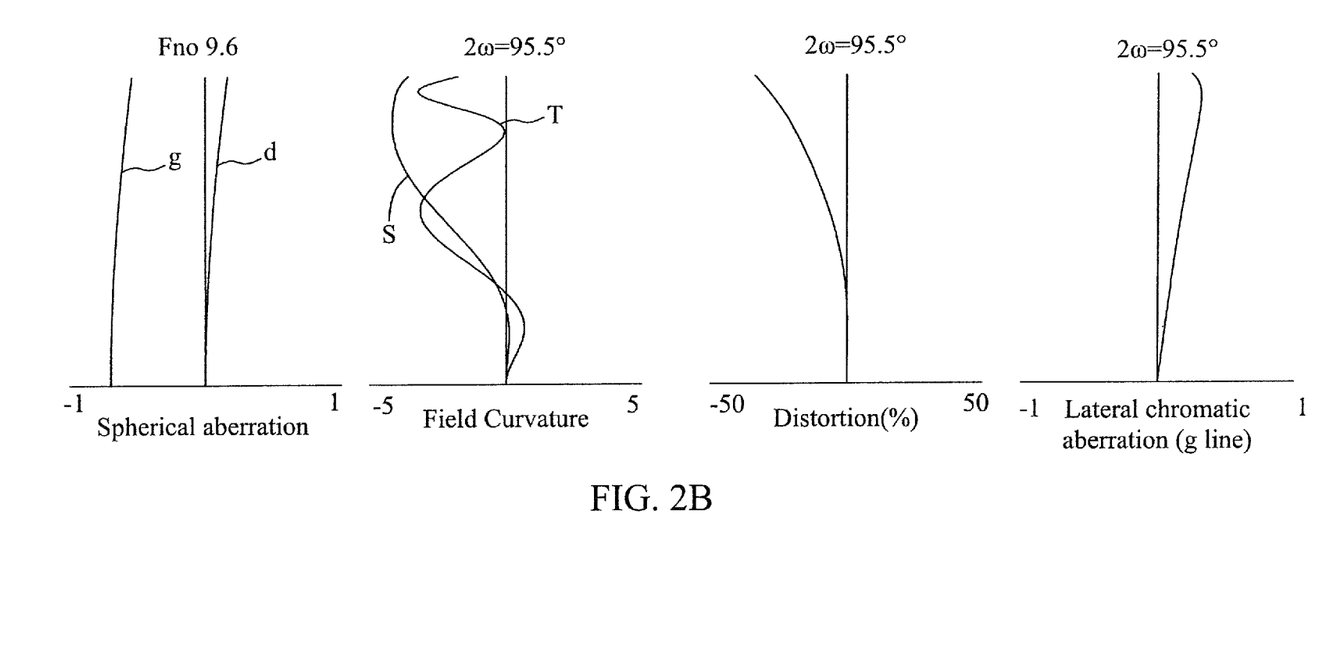
FIG. 2B is a diagram depicting the optical effect of the first embodiment illustrating the wide-angle lens according to the present invention.

FIG. 2A is the diagram of the lens combination depicting the first embodiment of the wide-angle lens according to the present invention. Table 1 and Table 2 are the experimental data for the first embodiment. FIG. 2B shows the optical effect of the first embodiment of the wide-angle lens according to the present invention. Each of graphs in FIG. 2B represents the spherical aberration, field curvature, distortion, and lateral chromatic aberration of the wide-angle lens.

TABLE 1

Focal length f = 38.2, diaphragm value FNO = 9.6 and angle of filed of view 2ω = 95.5°.

| Lens Surface | Curvature radius R | Interval | Refractive index N | Abbe number V | Lens |
|---|---|---|---|---|---|
| Diaphragm | ∞ | 15.00 | | | |
| 2 | 40.734 | 14.05 | 1.52528 | 56.0 | L11 |
| 3 | −121.791 | 0.60 | | | |
| 4 | 328.714 | 13.76 | 1.52528 | 56.0 | L12 |
| 5 | −46.627 | 27.01 | | | |
| 6 | ∞ | | | | |

TABLE 2

| lens surface | aspherical coefficient | | | | | | | |
|---|---|---|---|---|---|---|---|---|
| | K | A | B | C | D | E | F | G |
| 2 | 0 | −2.193E−05 | 3.737E−09 | −5.775E−11 | 6.534E−14 | 0 | 0 | 0 |
| 3 | −603.441 | −2.867E−05 | −4.13E−09 | 2.622E−12 | 5.070E−14 | −9.733E−17 | 0 | 0 |
| 4 | 77.75 | 2.581E−05 | −7.759E−08 | 1.141E−10 | −5.042E−15 | −1.48E−16 | 1.32E−19 | −3.51E−23 |
| 5 | −12.979 | 1.274E−05 | 7.832E−08 | −3.528E−10 | 6.67E−13 | −6.91E−16 | 3.72E−19 | −7.99E−23 |

The Second Embodiment

Figure 3A:
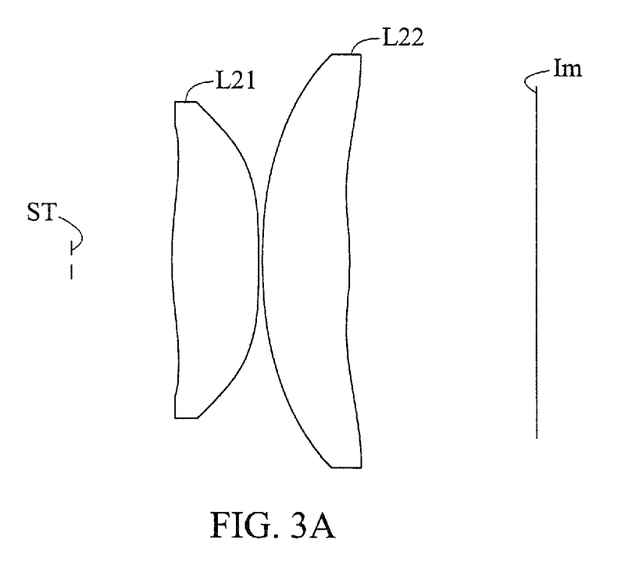
FIG. 3A is a diagram of lenses combination depicting a second embodiment illustrating a wide-angle lens according to the present invention.
Figure 3B:
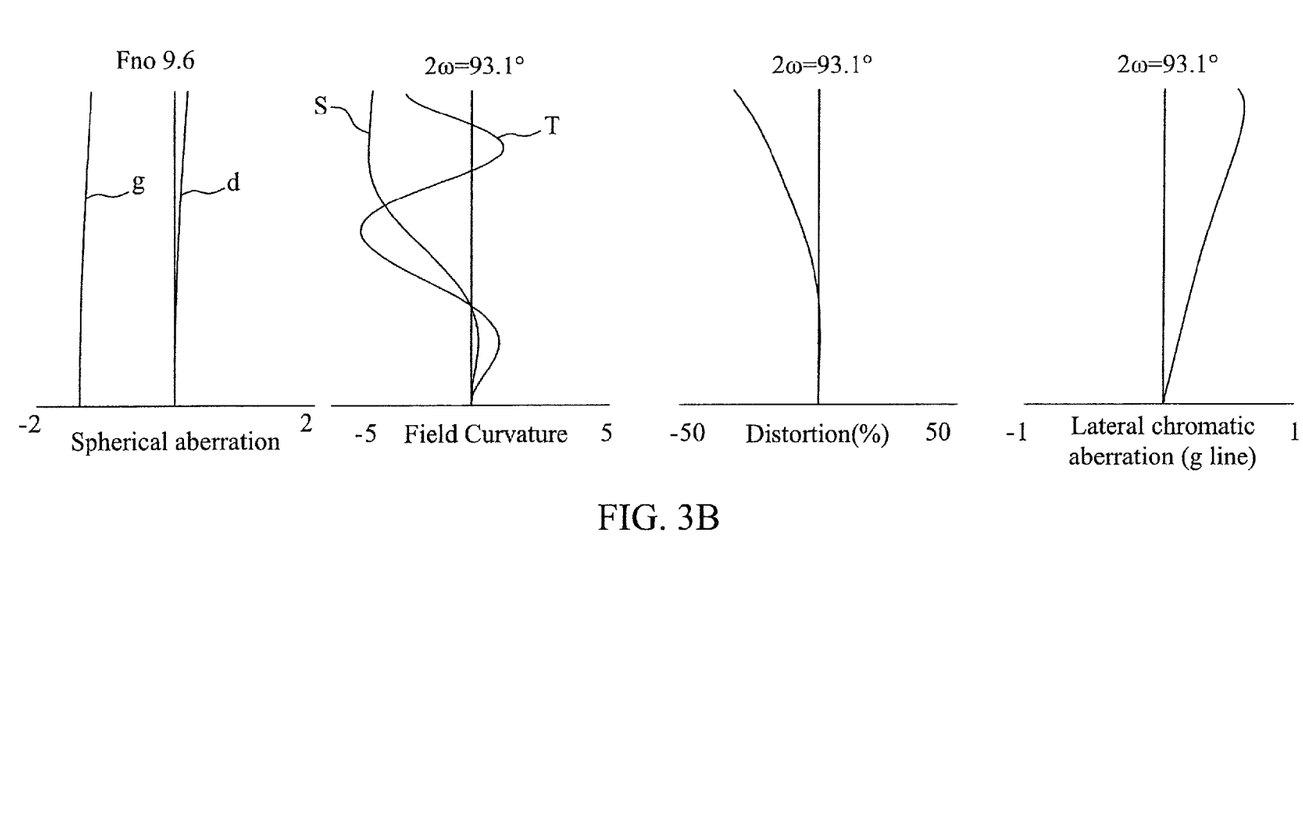
FIG. 3B is a diagram depicting the optical effect of the second embodiment illustrating the wide-angle lens according to the present invention.

FIG. 3A is a diagram of lenses combination depicting the second embodiment illustrating the wide-angle lens according to the present invention. Table 3 and Table 4 are the experimental data for the second embodiment. FIG. 3B shows the optical effect of the second embodiment of the wide-angle lens according to the present invention. Each of graphs in FIG. 3B represents the spherical aberration, field curvature, distortion, and lateral chromatic aberration of the wide-angle lens.

TABLE 3

Focal length f = 38.3, diaphragm value FNO = 9.6 and angle of filed of view 2ω = 93.1°.

| Lens Surface | Curvature radius R | Interval | Refractive index N | Abbe number V | Lens |
|---|---|---|---|---|---|
| Diaphragm | ∞ | 15.00 | | | |
| 2 | 47.481 | 13.39 | 1.58547 | 29.9 | L21 |
| 3 | −122.166 | 0.60 | | | |
| 4 | 328.714 | 13.21 | 1.58547 | 29.9 | L22 |
| 5 | −55.811 | 28.06 | | | |
| 6 | ∞ | | | | |

TABLE 4

| lens surface | aspherical coefficient | | | | | | | |
|---|---|---|---|---|---|---|---|---|
| | K | A | B | C | D | E | F | G |
| 2 | 0 | −2.438E−05 | −1086E−09 | 2.178E−11 | −5.547E−16 | 0 | 0 | 0 |
| 3 | −621.457 | −2.792E−05 | −5.855E−09 | 5.185E−12 | −9.004E−14 | 7.526E−17 | 0 | 0 |
| 4 | 77.75 | 3.757E−05 | −1.150E−07 | 1.844E−10 | −1.065E−13 | −5.87E−17 | 9.75E−20 | −3.19E−23 |
| 5 | −0.297 | 3.765E−05 | 2.551E−09 | −2.463E−10 | 6.36E−13 | −7.86E−16 | 4.86E−19 | −1.19E−22 |

The Third Embodiment

Figure 4A:
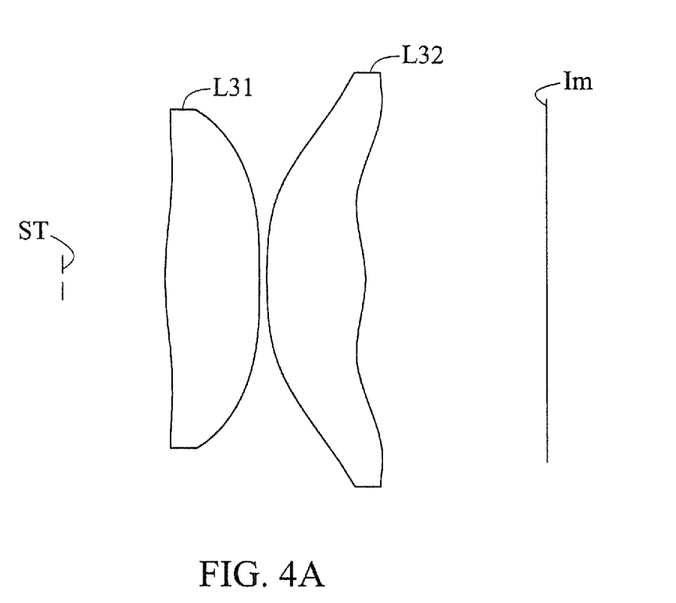
FIG. 4A is a diagram of lenses combination depicting a third embodiment illustrating a wide-angle lens according to the present invention.
Figure 4B:
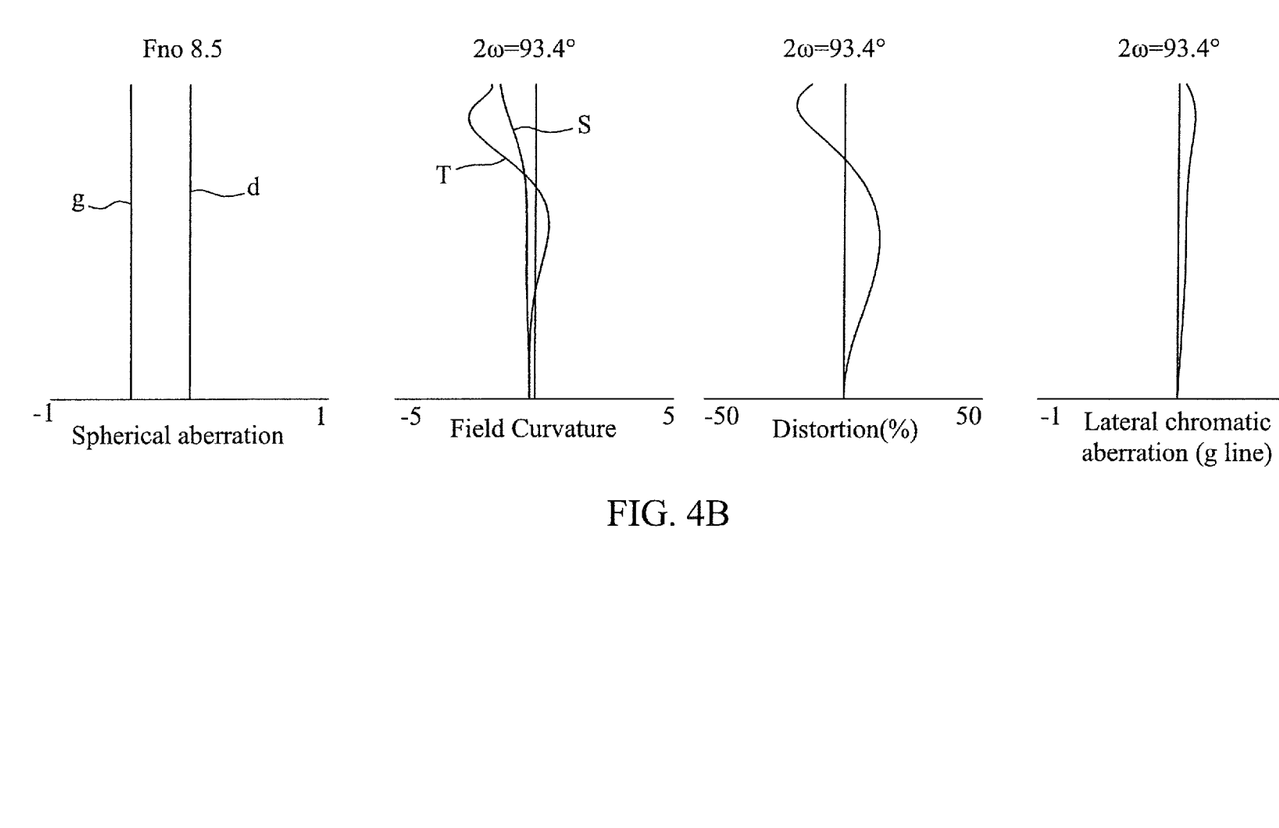
FIG. 4B is a diagram depicting the optical effect of the third embodiment illustrating the wide-angle lens according to the present invention.

FIG. 4A is a diagram of lenses combination depicting the third embodiment illustrating the wide-angle lens according to the present invention. Table 5 and Table 6 are the experimental data for the third embodiment. FIG. 4B shows the optical effect of the second embodiment of the wide-angle lens according to the present invention. Each of graphs in FIG. 4B represents the spherical aberration, field curvature, distortion, and lateral chromatic aberration of the wide-angle lens.

TABLE 5

Focal length f = 33.6, diaphragm value FNO = 8.5 and angle of filed of view 2ω = 93.4°.

| Lens Surface | Curvature radius R | Interval | Refractive index N | Abbe number V | Lens |
|---|---|---|---|---|---|
| diaphragm | ∞ | 15.00 | | | |
| 2 | 86.174 | 13.70 | 1.58547 | 29.9 | L31 |
| 3 | −190.821 | 1.00 | | | |
| 4 | 87.976 | 14.40 | 1.49176 | 57.4 | L32 |
| 5 | −26.393 | 26.47 | | | |
| 6 | ∞ | | | | | angle lens according to the present invention. Each of graphs in FIG. 5B represents the spherical aberration, field curvature, distortion, and lateral chromatic aberration of the wide-angle lens.

TABLE 7

Focal length f = 37.1, diaphragm value FNO = 9.3 and angle of filed of view 2ω = 94.4°.

| Lens Surface | Curvature radius R | Interval | Refractive index N | Abbe number V | Lens |
|---|---|---|---|---|---|
| diaphragm | ∞ | 15.00 | | | |
| 2 | 57.699 | 13.03 | 1.58547 | 29.9 | L41 |
| 3 | −89.596 | 0.60 | | | |
| 4 | 328.714 | 13.37 | 1.58547 | 29.9 | L42 |
| 5 | −49.440 | 28.07 | | | |
| 6 | ∞ | | | | |

TABLE 6

| lens surface | aspherical coefficient | | | | | | | |
|---|---|---|---|---|---|---|---|---|
| | K | A | B | C | D | E | F | G |
| 2 | 0 | −8.530E−06 | −1.693E−09 | 1.073E−12 | 3.109E−15 | 0 | 0 | 0 |
| 3 | 39.38 | −1.575E−05 | −6.856E−10 | −9.159E−14 | 1.760E−15 | 0 | 0 | 0 |
| 4 | 5.443 | 4.149E−05 | −1.012E−07 | 1.197E−10 | −7.828E−15 | −1.46E−16 | 1.37E−19 | −3.76E−23 |
| 5 | −17.24 | 2.630E−05 | 6.625E−08 | −3.556E−10 | 6.71E−13 | −6.92E−16 | 3.69E−19 | −7.64E−23 |

The Fourth Embodiment

Figure 5A:
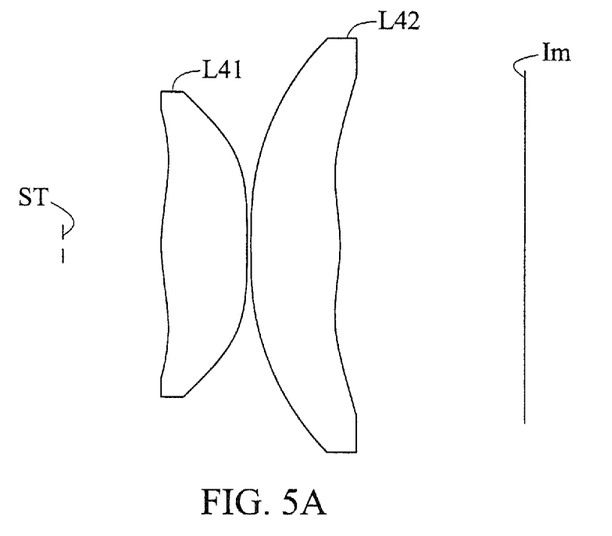
FIG. 5A is a diagram of lenses combination depicting a fourth embodiment illustrating a wide-angle lens according to the present invention.
Figure 5B:
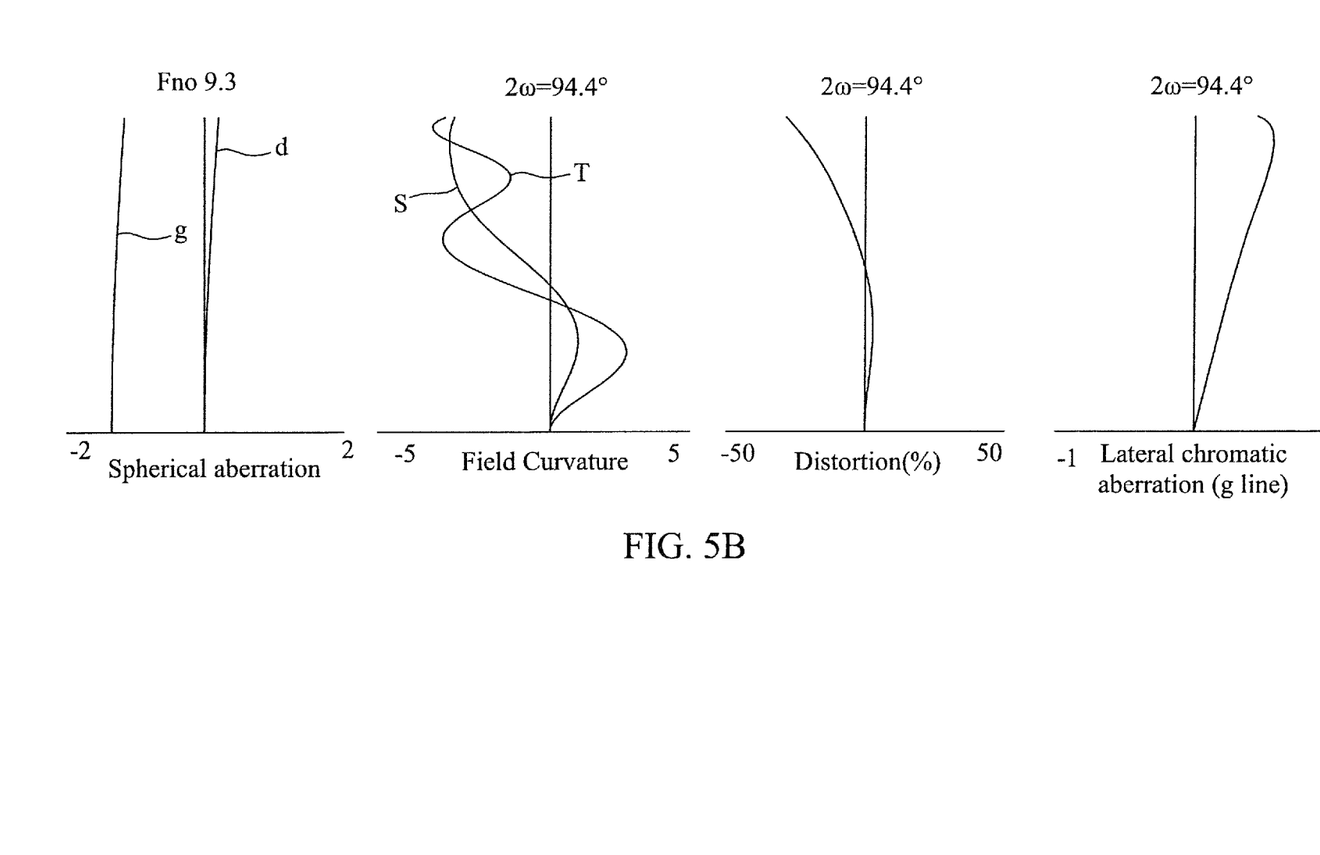
FIG. 5B is a diagram depicting the optical effect of the forth embodiment illustrating the wide-angle lens according to the present invention.

FIG. 5A is a diagram of lenses combination depicting the forth embodiment illustrating the wide-angle lens according to the present invention. Table 7 and Table 8 are the experimental data for the third embodiment. FIG. 5B shows the optical effect of the second embodiment of the wide-

TABLE 8

| lens surface | aspherical coefficient | | | | | | | |
|---|---|---|---|---|---|---|---|---|
| | K | A | B | C | D | E | F | G |
| 2 | 0 | −1.385E−05 | −4.736E−08 | 9.045E−11 | −2.893E−14 | 0 | 0 | 0 |
| 3 | −345.019 | −3.122E−05 | 5.452E−09 | 2.546E−11 | −9.547E−14 | 1.140E−16 | 0 | 0 |
| 4 | 77.75 | 3.355E−05 | −7.813E−08 | 9.104E−11 | 1.046E−14 | −1.30E−16 | 1.11E−19 | −2.96E−23 |
| 5 | −1.066 | 4.216E−05 | 1.899E−08 | −2.959E−10 | 6.56E−13 | −7.24E−16 | 4.07E−19 | −9.17E−23 |

According to Table 1, Table 3, Table 5 and Table 7, the wide-angle lens according to the present invention can have a view angle greater than 85°.

Table 9 shows the experimental data of the foregoing first, second, third and forth embodiments, and Table 10 shows the data comparison of the first, second, third and forth embodiments. The data in Table 9 is set into the conditional expression in Table 10 for calculation, and the calculated results are shown in the Table 10.

TABLE 9

| Condition | Embodiments | | | |
| --- | --- | --- | --- | --- |
| | First | Second | Third | Forth |
| f | 38.2 | 38.3 | 33.6 | 37.1 |
| $f_1$ | 59.6 | 59.6 | 102.4 | 61.5 |
| $f_2$ | 58.4 | 81.8 | 42.9 | 73.7 |
| ImgH | 27.5 | 27.5 | 27.5 | 27.5 |

TABLE 10

| Condition | Embodiments | | | |
| --- | --- | --- | --- | --- |
| | First | Second | Third | Fourth |
| $\frac{f}{f_1} - \frac{f}{f_2}$ | −0.01 | 0.17 | −0.46 | 0.10 |
| $\frac{f_1}{f_2}$ | 1.02 | 0.73 | 2.39 | 0.83 |
| $\frac{f}{f_1}$ | 0.64 | 0.64 | 0.33 | 0.60 |
| $\frac{f}{f_2}$ | 0.65 | 0.47 | 0.78 | 0.50 |
| $\frac{f}{ImgH}$ | 1.39 | 1.39 | 1.22 | 1.35 |
| $N_1$ | 1.525279 | 1.58547 | 1.58547 | 1.58547 |
| $N_2$ | 1.525279 | 1.58547 | 1.491756 | 1.58547 |

Hence, the wide-angle lens according to the present invention has a greater view angle and the lens surfaces of the first lens and the second lens are aspherical to reach better aberration correction. Hence, the present invention is suitable for HMDs, game consoles and other electronic equipment.

The foregoing embodiments merely exemplarily describe the principles and effectiveness of the invention instead of limiting it. Those skilled in the art can encompass all such modifications and alteration to the above embodiments without violating the technical idea of the present invention. Therefore, the protection scope of the rights of the invention is claimed as patent applications listed.

What is claimed is:

1. A wide-angle lens applicable to a head-mounted display having a display screen, the wide-angle lens comprising:
a first lens having a positive refractive power; and
a second lens having a positive refractive power and disposed between the display screen and the first lens;
wherein light emitted by the display screen passes to a user through the second lens and the first lens sequentially, and the wide-angle lens satisfies the following conditions:

$$-0.65 < \frac{f}{f_1} - \frac{f}{f_2} < 0.60 \text{ and } 0.2 < \frac{f_1}{f_2} < 3.8,$$

where $f_1$ and $f_2$ are focal lengths of the first lens and the second lens, respectively, and f is a focal length of the wide-angle lens, and wherein the wide-angle lens has a view angle greater than 85°.

2. The wide-angle lens of claim 1, wherein the wide-angle lens further satisfies the following condition:

$$0.2 < \frac{f}{f_1} < 0.85.$$

3. The wide-angle lens of claim 1, wherein the wide-angle lens further satisfies the following condition:

$$0.15 < \frac{f}{f_2} < 0.95.$$

4. The wide-angle lens of claim 1, wherein the wide-angle lens further satisfies the following condition:

$$1 < \frac{f}{ImgH} < 1.7,$$

where ImgH represents an image height of an image corresponding to a maximum field of view.

5. The wide-angle lens of claim 1, wherein the first lens satisfies the following condition: $N_1 > 1.52$, where $N_1$ is a refractive index of the first lens.

6. The wide-angle lens of claim 1, wherein the second lens satisfies the following condition: $N_2 > 1.49$, where $N_2$ is a refractive index of the second lens.

7. The wide-angle lens of claim 1, wherein the first lens and the second lens are made of plastic.

8. The wide-angle lens of claim 1, wherein the first lens and the second lens have aspherical lens surfaces.

* * * * *